United States Patent [19]
Ganek et al.

[11] Patent Number: 5,682,597
[45] Date of Patent: Oct. 28, 1997

[54] HYBRID VIDEO-ON-DEMAND BASED ON A NEAR-VIDEO-ON-DEMAND SYSTEM

[75] Inventors: Alan George Ganek, Chappaqua; Louis Paul Herzberg, Monsey; Antonio Ruiz, Yorktown Heights; Barry Edward Willner, Briarcliff Manor, all of N.Y.

[73] Assignee: International Business Machines Corporation, Armonk, N.Y.

[21] Appl. No.: 490,880

[22] Filed: Jun. 15, 1995

[51] Int. Cl.$^6$ ................................................ H04N 7/10
[52] U.S. Cl. .......................... 455/4.2; 348/7; 348/10
[58] Field of Search .......................... 348/7, 6, 8, 10, 348/12, 13; 455/4.1, 4.2, 5.1

[56] References Cited

U.S. PATENT DOCUMENTS

| | | | |
|---|---|---|---|
| 3,786,424 | 1/1974 | McVoy et al. | 340/151 |
| 4,028,733 | 6/1977 | Ulicki | 360/10 |
| 4,077,006 | 2/1978 | Nicholson | 325/308 |
| 4,222,068 | 9/1980 | Thompson | 358/120 |
| 4,290,142 | 9/1981 | Schnee et al. | 455/3 |
| 4,408,345 | 10/1983 | Yashiro et al. | 455/3 |
| 4,461,032 | 7/1984 | Skerlos | 455/4 |
| 4,688,248 | 8/1987 | Tomizawa | 380/20 |
| 4,710,955 | 12/1987 | Kauffman | 380/10 |
| 4,995,078 | 2/1991 | Monslow et al. | 380/10 |
| 5,206,722 | 4/1993 | Kwan | 358/86 |
| 5,357,276 | 10/1994 | Banker et al. | 348/12 |
| 5,371,532 | 12/1994 | Gelman et al. | 348/13 |
| 5,410,343 | 4/1995 | Coddington et al. | 348/7 |
| 5,414,455 | 5/1995 | Hooper et al. | 348/7 |
| 5,421,031 | 5/1995 | DeBey | 455/5.1 |
| 5,477,263 | 12/1995 | O'Callaghan et al. | 348/7 |

FOREIGN PATENT DOCUMENTS

| PCT/AU90/ | | | |
|---|---|---|---|
| 00370 | 3/1991 | WIPO | H04H 1/00 |

*Primary Examiner*—John K. Peng
*Assistant Examiner*—Nathan J. Flynn
*Attorney, Agent, or Firm*—Kevin M. Jordan

[57] ABSTRACT

A system and method for Video-on-Demand (VOD) satisfying the desire of 'surfers'. The process entails a server operating in a standard NVOD mode, whereby it continuously sends multiple copies of each program on separate channels. Each copy is delayed by a staggered time interval. The invention provides a way to fulfill a VOD user request asynchronous with the start of a NVOD transmission but which still makes primary use of the NVOD transmission for that requestor. The system and method combines independent server service satisfying an asynchronous request for only a short duration, usually less than or equal to the NVOD staggered time interval, and then aligns that requestor with an immediately previously commenced NVOD transmission.

26 Claims, 5 Drawing Sheets

HYBRID VIDEO-ON-DEMAND BASED ON A NEAR-VIDEO-ON-DEMAND SYSTEM

FIELD OF THE INVENTION

This invention relates to a method and system for optimizing transmission efficiency and access capacity on a communications network; and particularly, although not exclusively, a process, system and apparatus for an efficient Video-on-Demand Multimedia Server System.

BACKGROUND OF THE INVENTION

Supplying Video-On-Demand, (VOD) can be expensive, inefficient and complex. Ideally, a server should quickly satisfy a users request for a video program. This can be accomplished by serving the video program on a separate channel for each user. This can be an expensive proposition for systems with many users. An alternative is providing Near-Video-On-Demand (NVOD), wherein a video program is repeatedly made available to users at some fixed staggered time interval. User requests on a NVOD system are thus subject to delays of up to the staggered time interval, which is typically many minutes.

NVOD systems do not satisfy the needs of potential users such as Surfers browsing through many channels to determine which video program to view. Surfers typically desire quick request satisfaction. With NVOD, this can theoretically be satisfied by utilizing a de minimus, e.g., one second, stagger interval. In the most simplistic way this would require the program to be simultaneously broadcast on a number of channels equal to the number of seconds of the program duration. For example, a program taking 2 hours (7,200 seconds, with the start of each channel staggered at a one second interval from another) would require 7,200 channels. A method and system is needed which can efficiently provide Video-on-Demand in a cost-effective manner and which is easily adaptable to current technology.

SUMMARY OF THE INVENTION

The Hybrid Video-on-Demand (HVOD) method and system of the present invention employs a server operating in NVOD mode, i.e., wherein multiple copies of each program are continuously sent on separate channels. The start of each copy is offset by a staggered time interval.

The process, system and apparatus of the present invention advantageously fulfills VOD user requests asynchronous with the start of an NVOD channel, while maintaining primary use of the NVOD transmission for that requestor.

According to a preferred embodiment of the present invention there is provided a method of providing video-on-demand of the type wherein a video program is repeatedly transmitted at a staggered time interval from a video-on-demand-server to a viewbox wherein the viewbox is responsive to the video-on-demand-server which receives a request for the video program. The method comprising, at a head end: assigning and routing a beginning portion of the video program to the viewbox, responsive to the receipt of the request for the video program; and at a receiver end: selecting an in-progress transmission of the video program and storing it in a buffer associated with the viewbox, responsive to the request for the video program; selecting the beginning portion of the video program for output, responsive to the assigning step; and contiguously splicing the in-progress transmission stored in the buffer to a conclusion of the beginning portion of the video program, for output by the viewbox.

According to another aspect of the present invention there is provided a viewbox apparatus for use with a video-on-demand system of the type wherein a video program is repeatedly transmitted at a staggered time interval from a video-on-demand-server, comprising: means for selecting an in-progress transmissions of the video program and storing it in a buffer responsive to the request for the video program; means for receiving from the video-on-demand server a beginning portion of video program, for output by the viewbox; and means for contiguously splicing the in-progress transmission stored in the buffer to the conclusion of the beginning portion of the video program, for output by the viewbox.

DESCRIPTION OF THE PREFERRED EMBODIMENT

Figure 1:
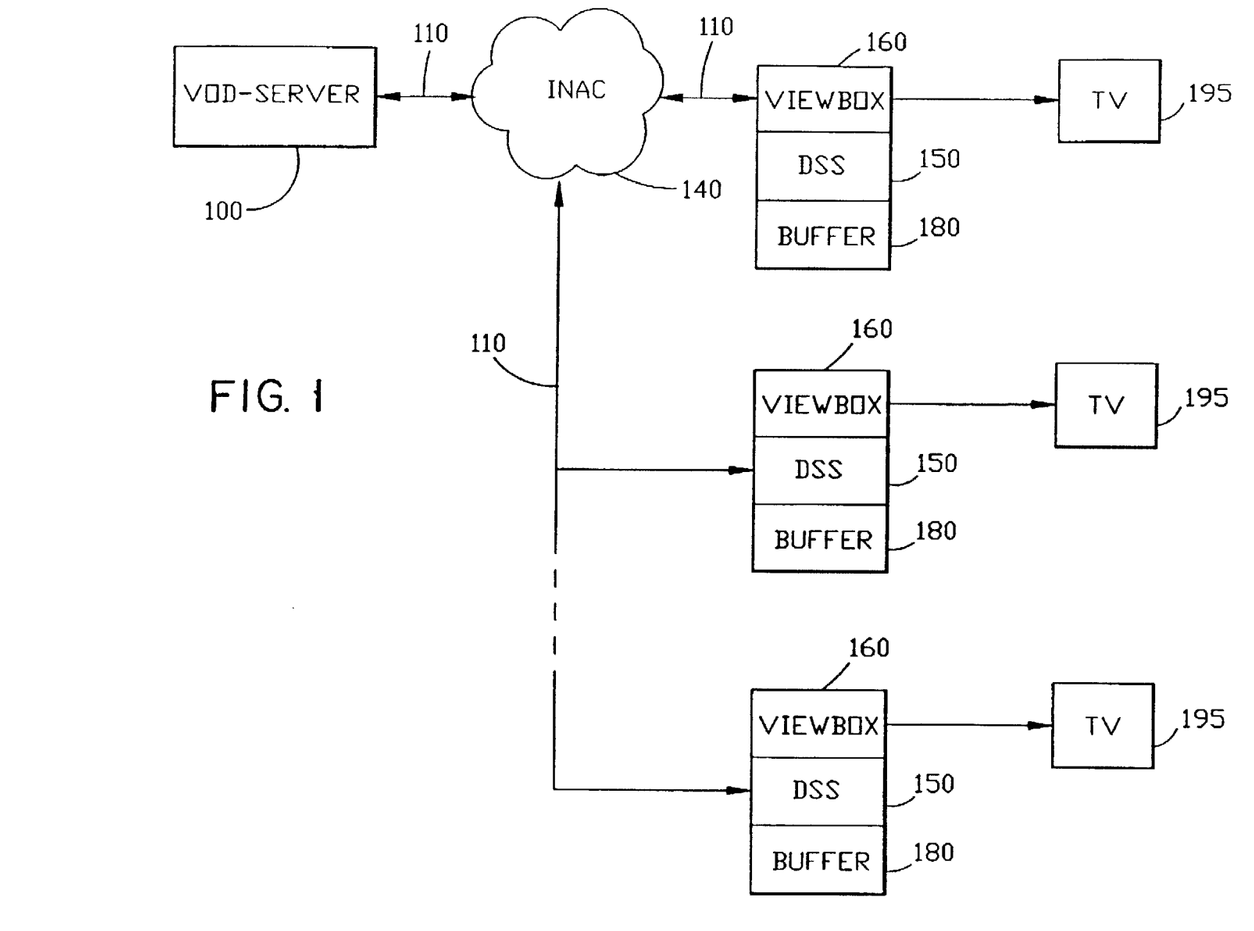
FIG. 1 is a block diagram of an embodiment of a hybrid video-on-demand multimedia server system according to the present invention.

FIG. 1 illustrates an embodiment of a cable television signal distribution system, specifically a 'Hybrid Video-on-Demand Multimedia Server System' (HMSS) according to the present invention. As is temporally illustrated in FIG. 2a, the system of the present invention is of a type commonly referred to as Near-video-on-demand (NVOD) wherein a video program is repeatedly made available at a staggered time interval Tstag. Returning now to FIG. 1, an NVOD system is transmitted from a VOD-server 100 on a plurality of channels coupled by transmission line 110 and Interactive Network and Controller (INAC) 140 to a plurality of television receivers (TV) 195 through a viewbox 160 coupled between the INAC 140 and each TV 195.

The INAC 140 provides a bi-directional transport means, transmission bandwidth and control to satisfy user requests which may be made by a user interface associated with each viewbox. Those skilled in the art will appreciate that the INAC can be implemented by existing cable television (CATV) networks, e.g., the interactive cable systems of the type described in U.S. Pat. Nos. 4,290,142, 4,408,345, and 4,710,955 which are hereby incorporated by reference.

The transmission line 110 also includes a plurality of channels assignable for transmission of a beginning portion of each requested program from the VOD-server to the requesting viewbox when a request is made asynchronous with the start of one of the staggered programs. A buffer 180 is also associated with each viewbox 160 for storing the immediately previous one of the staggered programs associated with a request. Each viewbox further is associated with a dual selection and splicing mechanism (DSS) 150 which is responsive to the VOD-server for splicing the immediately previous transmission of the requested program to the conclusion of the beginning portion of the requested program for uninterrupted on-demand presentation to the requesting viewer on the TV 195.

The program request includes the information necessary for the VOD-server to selectively address and control the requesting viewbox 160 functions by means well known to those skilled in the art. For example, U.S. Pat. No. 5,206,722 which is hereby incorporated by reference utilizes a conventional set top box including an appropriately programmed microcontroller and frequency sensitivity keying receiver to perform remote channel switching for video on demand service. In U.S. Pat. No. 4,461,032 which is hereby incorporated by reference a CATV service controller is disclosed which includes a control address circuit for receiving address and operating mode control signals from the head end. A microcontroller is a device that typically includes a microprocessor plus other associated circuitry such as random access memory (RAM), serial input/output, and/or analog-to-digital conversion (ADC) capabilities. Accordingly, the microcontroller's functions could be performed by a microprocessor plus other external associated circuitry, but the term "microcontroller" is used herein because that is the term commonly used for such devices in commercial viewboxes.

The term "channel" means a band of video frequencies which are suitable for transmitting sufficient information to permit reconstruction of the video image and the audio sound by the TV 195, e.g., as in a standard NTSC channel. In addition, general central computer control of a CATV distribution system is well known in the art, does not form a part of the present invention, and therefore will not be discussed further herein.

In the following description, numerous well-known components are shown in block diagram form in order not to obscure the described inventive concepts in unnecessary detail. In other instances, specific details are provided in order that these inventive concepts may be clearly understood. It will be apparent to those skilled in the art that the described inventive concepts may be employed without use of these specific details and that the scope of the present invention is not limited by their disclosure.

Figure 4:
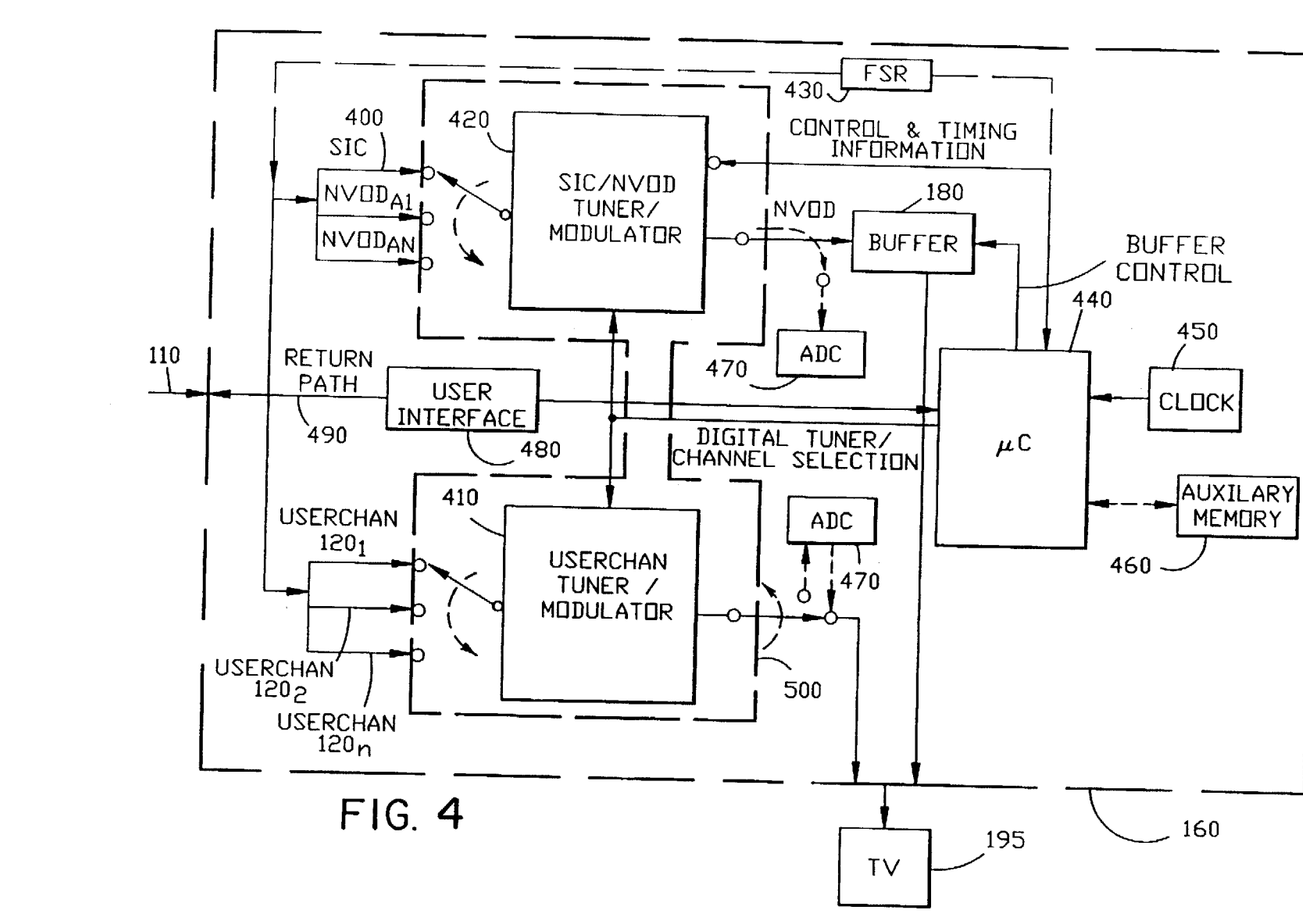
FIG. 4 is a schematic block diagram of a viewbox apparatus including a dual selection and splicing mechanism according to an embodiment of the present invention.

The function of the viewbox apparatus 160 and the dual selection and splicing mechanism 150 illustrated in FIG. 1 are depicted in FIG. 4. The viewbox 160 has an input coupled to transmission line 110 which may include a dedicated channel called the Service Information Channel (SIC) 400 which is used by the VOD-server 100 to send the viewbox 160 a menu of programs available for user viewing. The SIC 400 preferably also carries viewbox address and program control information used by the viewbox 160, e.g., to determine which channels carry the signals needed for each program; the real clock time starting instant of each offering and the stagger interval therebetween, as well as a continuous transmission of the precise present time of day (preferably updated to fractional seconds) in order to synchronize the splicing of secondary and primary channel content for uninterrupted output by the viewbox 160.

Each viewbox 160 may include a user interface 480 for transmitting a program request via a return path 490 in the transmission line 110 to the VOD-server 100 for a video program associated with the request. Alternatively, the return path 490 could be implemented independently of the INAC 140 in any one of the several ways well known to those skilled in the art, without departing from the true spirit and scope of the invention. For example, U.S. Pat. No. 4,995,078 which is hereby incorporated by reference discloses a system wherein viewers use a telephone to make requests either to a customer service representative or by use of an "auto-dial" device which would allow the requester to communicate directly with a scheduling computer included with the VOD-server. The viewbox 160 may also include an internal clock 450 to provide more precise timing synchronization for the DSS 150 and which will be discussed later. In a preferred embodiment the DSS 150 further comprises a microcontroller 440 which may be programmed by conventional means well known in the art to control tuning circuit 500 which may include SIC/NVOD tuner/modulator 420 and Userchan tuner/modulator 410. Specifically, microcontroller 440 may be programmed to tune the SIC/NVOD tuner/modulator 420 to the SIC 400 channel to receive instructions from the VOD-server 100 and/or store the control, address, and/or timing information in the microcontroller's internal RAM (if of sufficient capacity), and/or auxiliary memory 460 shown connected by dashed lines, and/or buffer 180. Alternatively, the address and operating mode control signals could be transmitted during the vertical interval of the cable television signal by means well known in the art. For example, U.S. Pat. No. 4,222,068 discloses encoder means for inserting data signals into selected retrace lines of the vertical interval and decoder means responsive to these data signals and selectively enabled or disabled thereby. The tuning circuit 500 is preferably under programmed control of microcontroller 440 which uses the aforementioned assigned one of a plurality of channels USERCHAN $120_1$–$120_n$ address and operating mode control signals received from the VOD-server 100 to tune the Userchan tuner/modulator 410 to the containing the beginning portion of the requested program corresponding to a request received asynchronous to the start of any NVOD transmission of that program. The Userchan tuner/modulator 410 processes the signal so that it can be displayed by TV 195. Those skilled in the art will appreciate that the duration of the beginning portion may be less than or equal to Tstag and still be within the true spirit and scope of the invention.

Figure 2A:
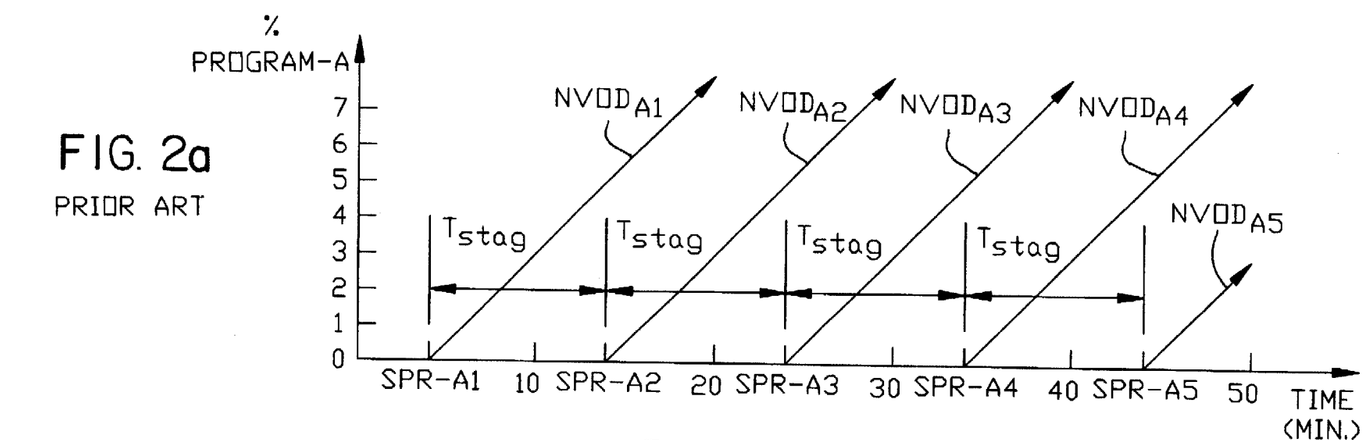
FIG. 2a is a timing diagram of a prior art Near-video-on-demand system (NVOD) of a type wherein a video program is repeatedly made available at a 10 minute staggered time interval.
Figure 2B:
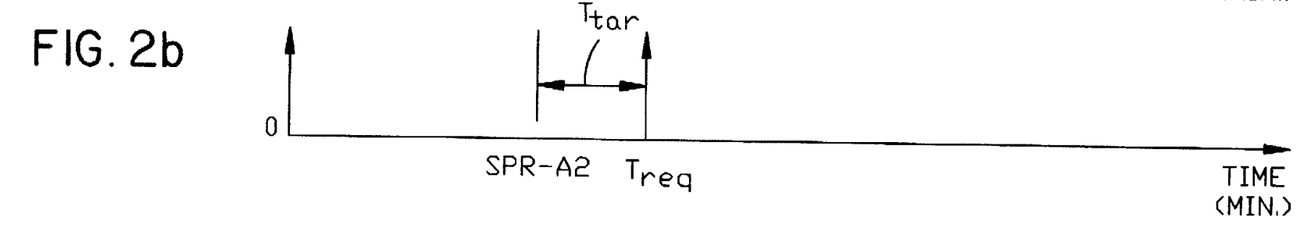
FIG. 2b is a timing diagram of an embodiment according to the present invention to be read concurrently with FIG. 2a, illustrating a request for a video program occurring at time $T_{req}$ that is asynchronous with the previous Near-video-on-demand (NVOD) NVOD u program start and offset therefrom by an amount $T_{tar}$.
Figure 2C:
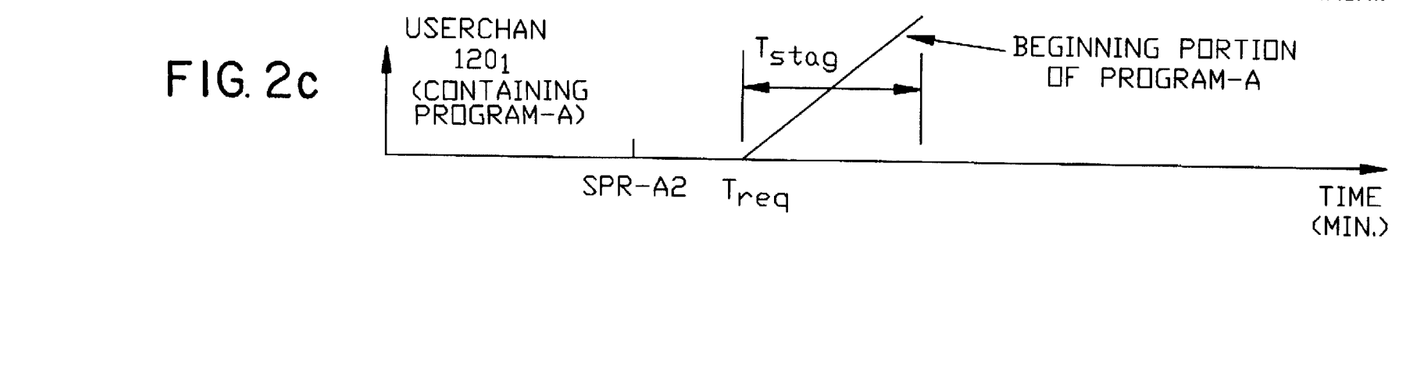
FIG. 2c is a timing diagram of an embodiment according to the present invention to be read concurrently with FIGS. 2a and 2b illustrating the serving of a separate user channel which contains a beginning portion of the video program associated with the request and which is routed to a user in response to a request.
Figure 2D:
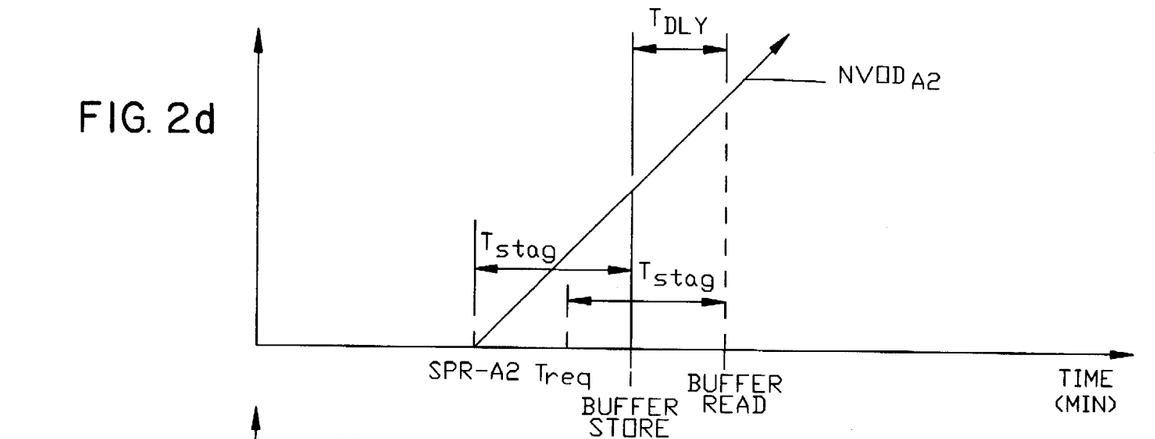
FIG. 2d is a timing diagram of an embodiment according to the present invention to be read concurrently with FIGS. 2a, 2b and 2c illustrating the timing and method of storing to and reading from a buffer the immediately previous transmission of a video program, in response to a request.

Returning to FIG. 4, the microcontroller 440 may also be programmed, based on the control and timing information obtained from the SIC 400, to simultaneously tune the SIC/NVOD tuner/modulator 420 to the immediately previous NVOD transmission. Referring now to FIG. 2d, the viewbox may commence recirculatingly storing the immediately previous NVOD transmission in the buffer 180 at the conclusion of the current staggered time interval. Preferably the buffer is of a type commonly known as a "hard drive" capable of alternate read and write operations. The microcontroller 440 may also be programmed to commence reading the buffer 180 for output to the TV 195 at a point offset by an amount Tstag relative to the input of the program request, i.e., Treq. Returning to FIG. 4, the microcontroller 440 is also programmed to simultaneously disconnect the Userchan tuner/modulator 410 output to the TV 195, thereby effectively "splicing" the beginning portion of the requested program to the previous NVOD transmission stored in the buffer for uninterrupted viewing on TV 195. Thereafter, the microcontroller is programmed to recirculatingly write to and read from the buffer 180 for the remainder of the previous NVOD transmission for output to the TV 195.

The timing synchronization required for the aforementioned splicing may be accomplished using the aforementioned VOD-server generated precise present time of day, e.g., updated to 0.1 second increments, in conjunction with internal clock 450 which may be used to more precisely calculate the offset, e.g., milliseconds between receipt of the program request and the conclusion of the current Tstag period.

It will be appreciated by those skilled in the art that there are several ways to splice the beginning portion to the NVOD portion without departing from the true spirit and scope of the invention. For example, the MPEG standards have been developed by the Moving Picture Experts Group (MPEG), part of a Joint technical committee of the International Standards Organization (ISO) and the International Electrotechnical Commission (IEC). The MPEG committee has been developing standards for the multiplexed, compressed representation of video and associated audio signals. The MPEG-1 (1.5 Mb/s) transmission protocol allows upwards of 26 programs and MPEG-2 (3 Mb/s) 12 programs to be transmitted on a single NTSC analog channel. Thus, tuning circuit 500 may comprise a single tuner capable of simultaneously receiving video/audio information corresponding to both the beginning portion of the program and the immediately previous NVOD transmission.

It will also be appreciated by those skilled in the art that the present invention is adaptable to numerous combinations of analog or digital transmissions and/or topologies without departing from the true spirit and scope of the invention. For example, analog- TV-to-digital-TV converter (ADC) 470 (shown connected by dashed lines) can be incorporated to allow the use of analog signals on transmission line 110 in combination with the preferred "hard drive" buffer 180. In this case, tuning circuit 500 could comprise analog mixers and detectors well known to those skilled in the art. Alternatively, buffer 180 could be an analog device. As an alternative to the use of SIC 400, the VOD-server may transmit appropriate signals containing an address portion thereby actuating a frequency signal keying (FSK) receiver 430 directing the signals to the microcontroller 440. The FSK is shown connected by dashed lines. The microcontroller 440 may be programmed by conventional means well known in the art to perform the functions responsive to the instructions or timing information transmitted from the VOD-server to accomplish the aforementioned features of the present invention.

There are various improvements that would result in increased efficiency of the HMSS. First, note that all synchronous user requests can be satisfied with the same USERCHAN service and NVOD service. The requirement of (almost) exact coincidence of user requests to enable the use of the same USERCHAN is extremely limiting. Thus, the vast majority of VOD requests would require separate USERCHAN assignments. This could require a large number of separate USERCHAN assignments.

Figure 2E:
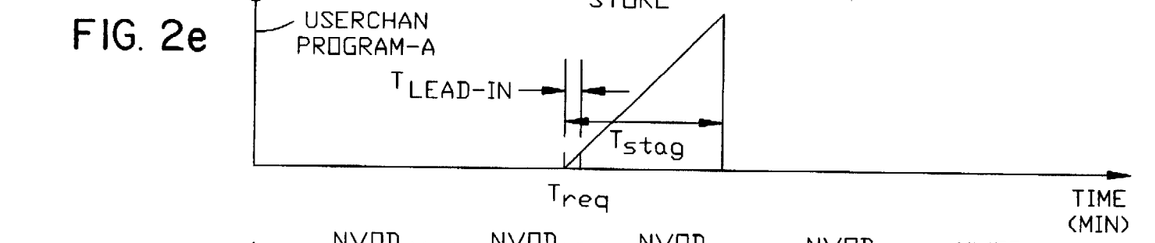
FIG. 2e is a timing diagram of an embodiment according to the present invention to be read concurrently with FIGS. 2a, 2b, 2c and 2d illustrating the timing and method of using a 10% lead-in with each separate user channel.

FIG. 2e illustrates another embodiment of the present invention, wherein a purposely protracted lead-in for each video program makes each of the plurality of channels USERCHAN $120_1$–$120_u$ available for a larger number of potential HVOD users and further enables transparent grouping of HVOD users. The lead-in is such that any portion of it satisfies the apparent start of the user requested program. Thus, if the lead-in duration is Tld seconds, all HVOD users that make requests within Tld seconds will be served by the same USERCHAN. Thus, the maximum number of separate USERCHAN $120_1$–$120_u$ required is reduced. For example, if Tld is set at 10% of Tstag, there can be at most a requirement for 10 separate USERCHAN $120_1$–$120_{10}$ transmissions. Preferably, the lead-in is specially prepared; or alternatively the repetition of the starting video frame by zooming it in and out repeatedly. It may use techniques known to those in the art to make a moving segment from a single or multiple frames.

Figure 2F:
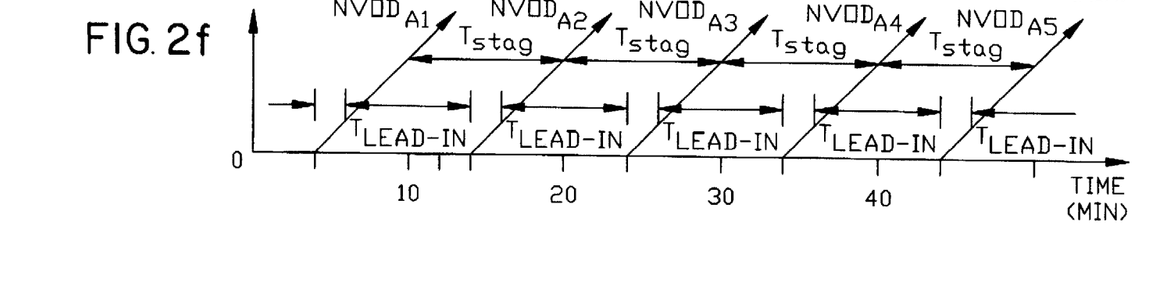
FIG. 2f is a timing diagram of an embodiment according to the present invention to be read concurrently with FIGS. 2a, 2b, 2c, 2d, and 2e illustrating the timing and method of using a 10% lead-in with each video program repeatedly made available at a staggered time interval.

Referring now to FIG. 2f, an embodiment in accordance with the present invention is shown wherein a lead-in (10% in this example) is used with each NVOD transmission to yield an increase in the number of HVOD requestors that are satisfied directly by NVOD without a USERCHAN assignment. Referring now to FIG. 2a, absent a USERCHAN assignment, a VOD user request would only be satisfied entirely by this prior art NVOD system if the request is synchronous with the start of the requested program. Thus, for Program-A, the request must coincide (or Just precede) time Spr-A1, Spr-A2, or Spr-A3, etc. It thus appears that the vast majority of HVOD requesters would require a USERCHAN assignment. Returning to FIG. 2f, user-transparent grouping of HVOD users is accomplished by using the lead-in for each video program in all the NVOD transmissions. In this case also, as explained above, if the lead-in duration is $T_{lead-in}$ seconds, all HVOD users that make requests within $T_{lead-in}$ seconds of the start of a NVOD will be served by that same NVOD. If $T_{lead-in}$ in is set at 10% of Tstag, all HVOD users that occur within the period $T_{lead-in}$ in from Tstag will be satisfied by that same NVOD transmission.

The combined use of a lead-in for both USERCHAN and NVOD purposes would result in further increases in total HVOD efficiency. For example, if $T_{lead-in}$ in is set at 10% for both purposes the maximum number of USERCHAN assignments required is reduced to 9.

Figure 3:
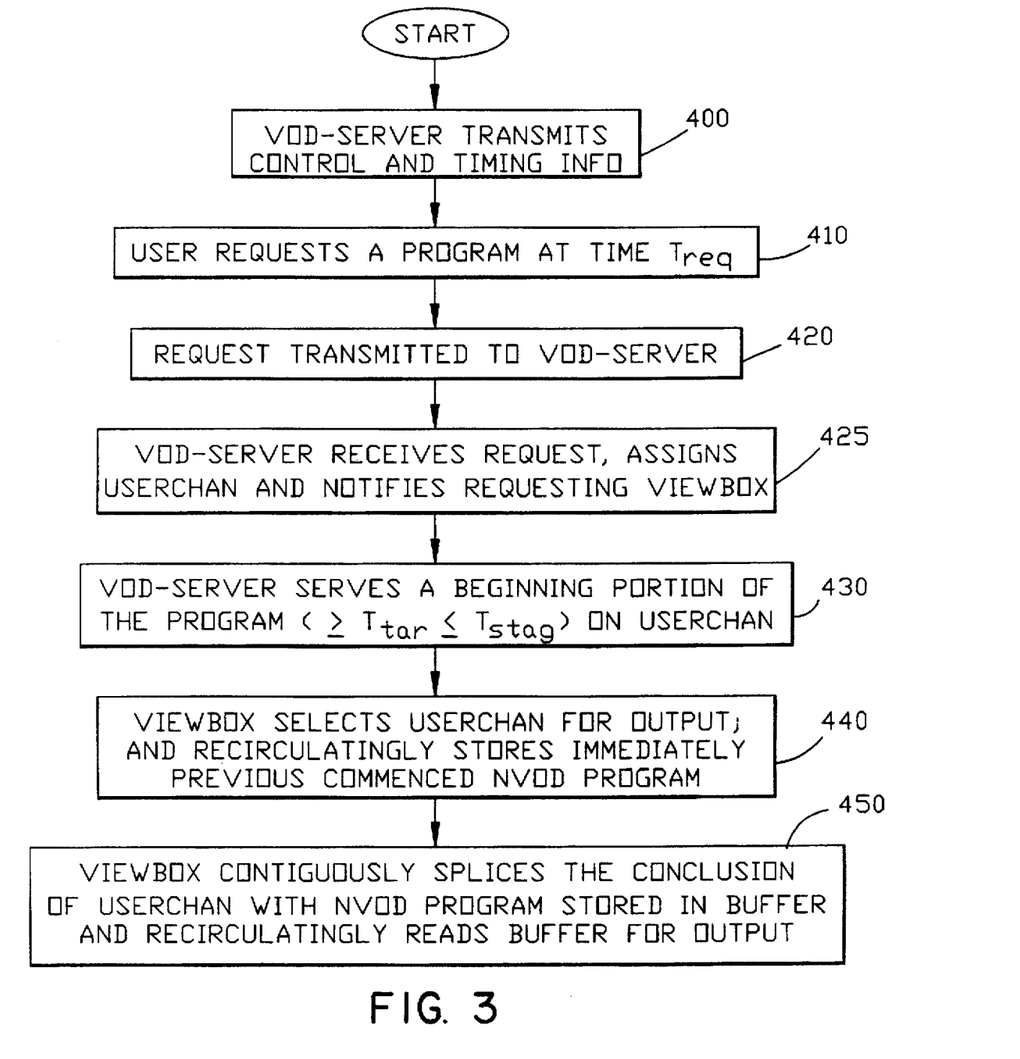
FIG. 3 is a flow chart of a preferred embodiment of a method of providing video-on-demand according to the present invention.

FIG. 3 illustrates a flow chart of a method according to the present invention for providing video-on-demand of the type wherein a video program is repeatedly made available at a staggered time interval over a transmission line to a viewbox adapted to transmit a request for a video program associated with the request. At step 400 the VOD-server makes available program control and timing information over the transmission line to each viewbox. At step 410 the user selects a program to view at time Treq via the user interface associated with viewbox 160. At step 420, the View-Box 160 determines the request is asynchronous to the start of any of the repeated transmissions of the requested program and sends a signal representing the request for a beginning portion of the video program to the VOD-Server 100 USERCHAN $120_1$–$120_u$ and notifies the requesting viewbox. At step via return path 490 in transmission line 110. At step 425, the VOD-server receives the request; assigns a selected one of the 430, the VOD-Server 100 quickly satisfies the request by serving the beginning portion of the requested video through the transmission line 110, on the assigned USERCHAN, for viewing via viewbox 160. Referring now to FIG. 2c, the assigned USERCHAN, e.g., USERCHAN 120₁, containing the beginning of the requested program may be served to the requesting viewbox for a time equal to the NVOD stagger interval, Tstag.

Returning now to FIG. 3, in step 440, the requesting viewbox 160 selects the assigned USERCHAN 120₁ and couples the beginning portion of the requested program for output to the requestor's TV 195. Referring now to FIG. 2d, the viewbox 160 concurrently stores the immediately previous (in-progress) NVOD transmission of the program, $NVOD_{A2}$ in this case, in buffer 180. The buffer 180 storage is preferably done in a recirculating manner and commences offset from the immediately previous NVOD program ($NVOD_{A2}$ in this case) start by an amount corresponding to Tstag from the actual start (of $NVOD_2$). This service connection is continued for the remaining duration of the program. Those skilled in the art will appreciate that although the preferred embodiment is described in terms of staggered time interval Tstag, the USERCHAN service and buffer storage commencement could be minimized to $T_{tar}=$ the tardiness of $T_{req}$ from the start of the previous (already in progress) NVOD transmission $NVOD_{A2}$, without departing from the true spirit and scope of the invention.

Preferably the buffer 180 is continuously and recirculatingly written with the immediately previous NVOD transmission of the program in order to minimize the size of the buffer 180 required. When the buffer end (top) is reached, filling (STORE) is continued by overwriting the buffer 180 from its beginning (bottom).

In step 450, with reference to FIGS. 2c and 2d, the viewbox 160 terminates the USERCHAN service connection and starts feeding the buffer 180 out at the conclusion of the USERCHAN service, so as to effectively splice the stored NVOD video frames to the end of the USERCHAN service, and thereafter continuously and recirculatingly read from the buffer 180 to the TV 195 until completion of the requested program. Thus, the buffer 180 capacity need not be much larger than Tstag. The READ is delayed from the WRITE by a fixed interval $T_{DLY}$ equal to the tardiness of the user request from the start time of the immediately preceding program $NVOD_{A2}$ start. The remainder of the requested program $NVOD_{A2}$ is thus output for uninterrupted viewing by the user.

From the above description of the preferred embodiment of the invention it will be apparent to those skilled in the art that numerous modifications and alterations may be made to the system and method of the present invention, other than those already described, without departing from the basic inventive concepts. For example, the process, system and apparatus of the present invention are also useful for other server applications servicing a family of users on a single or multi-media provision. It uses HVOD as described only because it is expected to be the initial application of the present invention. All such modifications and alterations are to be considered within the scope of the present invention the nature of which is to be determined from the foregoing description and the appended claims.

Having thus described our invention, what we claim as new and desire to secure by Letters Patent is:

1. A method of providing video-on-demand of the type wherein a video program is repeatedly transmitted at a staggered time interval from a video-on-demand-server to a viewbox wherein the viewbox is responsive to the video-on-demand-server which receives a request for the video program, the method comprising the steps of:

protracting a lead-in portion of the video program;
at a head end:
  assigning and routing a beginning portion of the video program which includes the protracted lead-in to one or more viewboxes, responsive to the receipt of one or more requests for the video program occurring within the lead-in; and at a receiver end:
  selecting an in-progress transmission of the video program and storing it in a buffer associated with the viewbox, responsive to the request for the video program;
  selecting the beginning portion of the video program for output, responsive to the assigning step; and
  contiguously splicing the in-progress transmission stored in the buffer to a conclusion of the beginning portion of the video program, for output by the viewbox.

2. A method of providing video-on-demand as claimed in claim 1, wherein the beginning portion of the video program is of a duration equal to or greater than the delay of the request from a start of the in-progress transmission of the video program.

3. A method of providing video-on-demand as claimed in claim 1 wherein the beginning portion of the video program is of a duration less than or equal to the staggered time interval.

4. A method as claimed in claim 1 wherein said storing is done in a recirculating manner; and wherein the splicing step further comprises reading the in-progress transmission stored in the buffer in a recirculating manner.

5. A method of providing video-on-demand as claimed in claim 1, further comprising the steps of:
protracting a lead-in portion of the video program repeatedly transmitted at the staggered time interval; and
at the head end:
  assigning the video program to one or more viewboxes requesting the video program within the protracted lead-in; and at a receiver end:
  selecting the video program with the protracted lead-in for output by the viewbox, responsive to said step of assigning the video program.

6. A method of providing video-on-demand as claimed in claim 1 wherein said storing commences at a point advanced from the start of the in-progress transmission of the video program by an amount equal to the duration of the beginning portion of the video program.

7. A method of providing video-on-demand as claimed in claim 1 further comprising the step of displaying the video program associated with the request on a display, responsive to the viewbox selecting the beginning portion of the video program for output.

8. A method of providing video-on-demand of the type wherein a video program is repeatedly transmitted at a staggered time interval from a video-on-demand-server to a viewbox, the method comprising the steps of:
protracting a lead-in portion of the video program;
at a receiver end:
  selecting an in-progress and transmission of the video program and storing it in a buffer associated with the viewbox, responsive to a request for the video program occurring within the lead-in;
  selecting a beginning portion of the video program which includes the protracted lead-in provided by the video-on-demand-server, for output by the viewbox responsive to the request for the video program; and
  contiguously splicing the in-progress transmission of the video program stored in the buffer to the conclusion of the beginning portion of the video program, for output by the viewbox.

9. A method as claimed in claim 8 wherein the duration of the beginning portion of the video program is equal to or greater than the delay of the request from the in-progress transmission of the video program and less than or equal to the staggered time interval.

10. A method as claimed in claim 8 wherein said storing is done in a recirculating manner; and wherein the splicing step further comprises reading the immediately previous commenced transmission of the video program stored in the buffer in a recirculating manner.

11. A method as claimed in claim 8, further comprising the steps of:

protracting a lead-in of the video program repeatedly transmitted at the staggered time interval;

and at a receiver end:

selecting the video program which includes the protracted lead-in for output by the viewbox when the request occurs within the lead-in.

12. A video-on-demand system of the type wherein a video program is repeatedly transmitted at a staggered time interval from a video-on-demand-server to the viewbox via a transmission line communicatively coupled therebetween, the system comprising:

at a head end:

means for assigning and routing a beginning portion of the video program which includes a protracted lead-in from the video-on-demand-server to one or more viewboxes associated with one or more requests for the video program occurring within the lead-in;

and at a receiver end:

means for selecting an in-progress one of the repeated transmissions of the video program and storing it in a buffer associated with the viewbox, responsive to the request for the video program;

means for selecting the beginning portion of the video program assigned and routed by the video-on-demand-server for output by the viewbox; and means for contiguously splicing the in-progress transmission stored in the buffer to a conclusion of the beginning portion of the video program, for output by the viewbox.

13. A video-on-demand system of a type wherein a video program is repeatedly transmitted at a staggered time interval from a video-on-demand-server to a viewbox via a transmission line communicatively coupled therebetween, the system comprising:

at a head end:

the video-on-demand-server being adapted for assigning and routing a beginning portion of the video program which includes a protracted lead-in from the video-on-demand-server to one or more viewboxes, in response to one or more requests for the video program occurring within the protracted lead-in;

and at a receiver end:

the viewbox having an input coupled to the transmission line and an output, the viewbox further including a tuning circuit having a first output, a second output, an input and a control point wherein the first output is switchably coupled to the output of the viewbox, the input being coupled to the input of the viewbox;

a remotely controlled switching device having a first output, a second output, and an input coupled to the input of the viewbox;

the second output of the remotely controlled switching device being coupled to the control point of the tuning circuit for switchably and adjustably selecting both the beginning portion of the video program routed from the video-on-demand-server and an in-progress transmission of the video program associated with the request;

wherein the beginning portion of the video program routed from the video-on-demand-server is switchably coupled to the first output of the tuning circuit and the selected in-progress transmission of the video program is switchably coupled to the second output of the tuning circuit; and a buffer for storing the selected in-progress transmission of the video program;

the buffer including a first input, a second input, and an output wherein the output of the buffer is switchably coupled to the output of the viewbox, the second input of the buffer is coupled to the second output of the tuning circuit, and the first input of the buffer is coupled to the first output of the switching device, and wherein the remotely controlled switching device is further adapted for contiguously splicing the in-progress transmission stored in the buffer to a conclusion of the beginning portion of the video program associated with the request.

14. A video-on-demand system as claimed in claim 13 wherein the remotely controlled switching device comprises a microcontroller.

15. A video-on-demand system as claimed in claim 13 wherein the beginning portion of the video program is of a duration equal to or greater than the delay of the request from a start of the in-progress transmission of the video program.

16. A video-on-demand system as claimed in claim 13 wherein the beginning portion of the video program associated with the program request is of a duration less than or equal to the staggered time interval.

17. A video-on-demand system as claimed in claim 13 wherein the remotely controlled switching device is further adapted for recirculatingly storing to and reading from the buffer.

18. A video-on-demand system as claimed in claim 13, further comprising:

means for protracting a lead-in portion of the video program repeatedly transmitted at the staggered time interval;

and at a receiver end:

means for selecting the video program which includes the protracted lead-in for output by the viewbox when the request occurs within the lead-in.

19. A video-on-demand system as claimed in claim 13 wherein the remotely controlled switching device is further adapted for commencing storing the in-progress transmission of the video program in the buffer at a point advanced by an amount equal to the duration of the beginning portion of the video program.

20. A viewbox apparatus for use with a video-on-demand system of a type wherein a video program is repeatedly transmitted at a staggered time interval from a video-on-demand-server, comprising:

means for selecting an in-progress transmission of the video program and storing it in a buffer responsive to the request for the video program;

means for receiving from the video-on-demand server a beginning portion of video program having a protracted lead-in portion for transparent grouping of one or more requests occurring within the lead-in, for output by the viewbox; and means for contiguously splicing the in-progress transmission stored in the buffer to the conclusion of the beginning portion of the video program, for output by the viewbox.

21. A viewbox apparatus having an output and an input, the input adapted for coupling to a receiver end of a video-on-demand system of a type wherein a video-on-demand-server coupled to a head end repeatedly transmits a video program at a staggered time interval, in response to a request for the video program, the viewbox comprising:

a tuning circuit having a first output, a second output, an input and a control point wherein the first output is switchably coupled to the output of the viewbox, the input being coupled to the input of the viewbox;

a remotely controlled switching device having a first output, a second output, and an input coupled to the input of the viewbox;

the second output of the remotely controlled switching device being coupled to the control point of the tuning circuit for switchably and adjustably selecting both the beginning portion of the video program having a protracted lead-in for transparent grouping of one or more requests occurring within the lead-in and an in-progress transmission of the video program associated with the request;

wherein the selected beginning portion of the video program is switchably coupled to the first output of the tuning circuit and the selected in-progress transmission of the video program is switchably coupled to the second output of the tuning circuit; and a buffer for storing the selected in-progress transmission of the video program;

the buffer including a first input, a second input, and an output wherein the output of the buffer is switchably coupled to the output of the viewbox, the second input of the buffer being coupled to the second output of the tuning circuit, and the first input of the buffer being coupled to the first output of the switching device;

wherein the remotely controlled switching device is further adapted for contiguously splicing the selected in-progress transmission stored in the buffer to a conclusion of the beginning portion of the video program.

22. A viewbox as claimed in claim 21 wherein the remotely controlled switching device comprises a microcontroller.

23. A viewbox as claimed in claim 21 wherein the beginning portion of the video program is equal to or greater than a duration of the delay of the request from a start of the in-progress transmission of the video program and less than or equal to the staggered time interval.

24. A viewbox as claimed in claim 21 wherein the remotely controlled switching device is further adapted for recirculatingly storing to and reading from the buffer.

25. A viewbox as claimed in claim 21 wherein the viewbox comprises a display for viewing the video program.

26. A viewbox as claimed in claim 21, further comprising:

means for protracting a lead-in portion of the video program repeatedly transmitted at the staggered time interval;

and at a receiver end:

means for selecting the video program which includes the lead-in for output by the viewbox when the request occurs within the lead-in associated with the video program.

* * * * *